United States Patent
Li

(10) Patent No.: US 9,578,158 B2
(45) Date of Patent: Feb. 21, 2017

(54) SYSTEM AND METHOD FOR STARTING UP APPLICATION OF ELECTRONIC DEVICE

(75) Inventor: Jun Li, Shenzhen (CN)

(73) Assignees: SHENZHEN FUTAIHONG PRECISION INDUSTRY CO., LTD., Shenzhen (CN); Chi Mei Communication Systems, Inc., New Taipei (TW)

(*) Notice: Subject to any disclaimer, the term of this patent is extended or adjusted under 35 U.S.C. 154(b) by 1204 days.

(21) Appl. No.: 13/337,122

(22) Filed: Dec. 25, 2011

(65) Prior Publication Data

US 2012/0259439 A1    Oct. 11, 2012

(30) Foreign Application Priority Data

Apr. 7, 2011   (CN) .......................... 2011 1 0086232

(51) Int. Cl.
*H04M 1/725* (2006.01)
*G06F 9/445* (2006.01)
*H04M 1/60* (2006.01)

(52) U.S. Cl.
CPC ........ *H04M 1/72558* (2013.01); *G06F 9/445* (2013.01); *H04M 1/6058* (2013.01); *H04M 1/72583* (2013.01)

(58) Field of Classification Search
None
See application file for complete search history.

(56) References Cited

U.S. PATENT DOCUMENTS

| 6,845,408 B1 * | 1/2005 | Lemke et al. ................. 710/18 |
| 2006/0045304 A1 | 3/2006 | Lee et al. |
| 2006/0290807 A1 * | 12/2006 | Kim ..................... H04N 5/4401 348/468 |

FOREIGN PATENT DOCUMENTS

| CN | 101242604 A | 8/2008 |
| CN | 101888434 A | 11/2010 |
| CN | 101986676 A | 3/2011 |

OTHER PUBLICATIONS

Samsung. "Samsung Galaxy S User Guide—Multitasking" p. 1 Jun. 2010.*
Cheng, "CN101242604 english translation." pp. 1-4.*

* cited by examiner

*Primary Examiner* — Joseph J Nguyen
*Assistant Examiner* — Qin Zhu
(74) *Attorney, Agent, or Firm* — Zhigang Ma

(57) ABSTRACT

In a method for starting up an application of an electronic device, usage histories of applications, which have used an audio channel of the electronic device, are read from a log file of a storage system of the electronic device when a headphone is inserted to a headphone socket of the electronic device and no application previously activated is using the audio channel. A menu list of icons of the applications is displayed on a display of the electronic device. An application selected from the menu list by a user is started up.

15 Claims, 5 Drawing Sheets

SYSTEM AND METHOD FOR STARTING UP APPLICATION OF ELECTRONIC DEVICE

BACKGROUND

1. Technical Field

Embodiments of the present disclosure relate to a system and method for starting up an application of an electronic device.

2. Description of Related Art

Many electronic devices, such as mobile phones, include a headphone socket configured to receive a headphone set. If a person using the phone to browse a website using a web browser wants to use a pair of headphones to listen to music, the person may be forced to close the web browser, and then start up media player software to play music and connect the headphones, which is inconvenient.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

Figure 1:
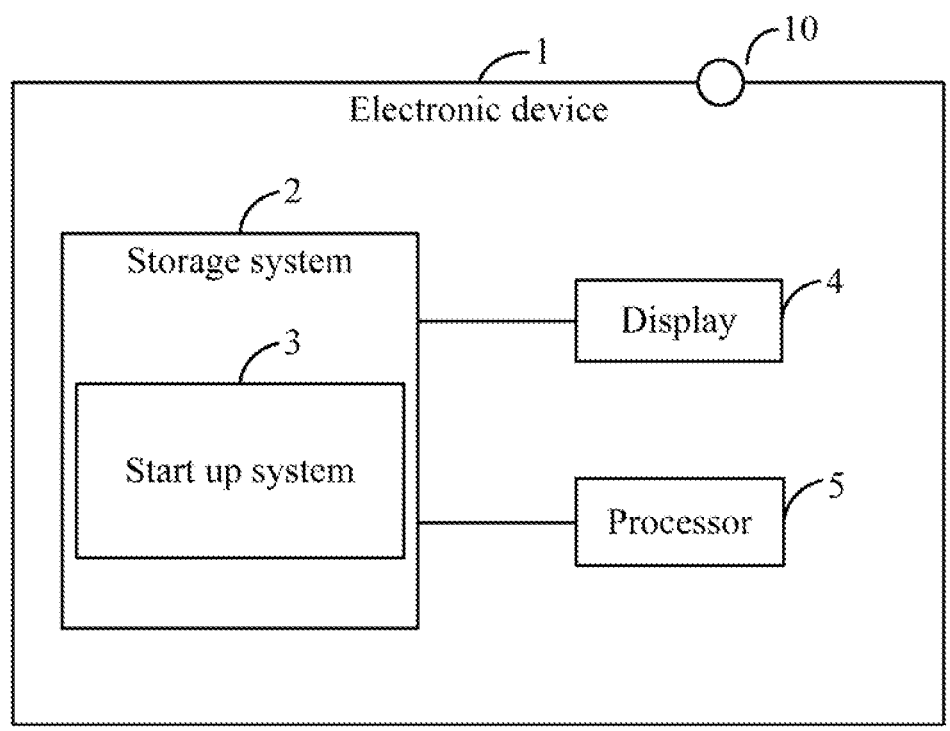
FIG. 1 is a block diagram of one embodiment of an electronic device including a start up system.

FIG. 1 is a block diagram of one embodiment of an electronic device 1 including a start up system 3. The electronic device 1 may be a mobile phone, a tablet PC, or a personal digital assistant, for example. In the embodiment, the electronic device 1 further includes a storage system 2, a display 4, at least one processor 5, and a headphone socket 10. The storage system 2 includes a plurality of applications, such as a media player application. The display 4 displays icons indicative of the plurality of applications. The display 4 may be a liquid crystal display, for example. The headphone socket 10 is configured to receive the plug of a headphone set (not shown). It should be apparent that FIG. 1 is just one example of the electronic device 1 that can be included with more or fewer components than shown in other embodiments, or a different configuration of the various components.

The start up system 3 may be in the form of one or more programs stored in the storage system 2 and executed by the at least one processor 5. In one embodiment, the storage system 2 may be random access memory (RAM) for temporary storage of information, and/or a read only memory (ROM) for permanent storage of information. In other embodiments, the storage system 2 may also be an external storage device, such as a storage card, or a data storage medium. The at least one processor 5 executes computerized operations of the electronic device 1 and other applications, to provide functions of the electronic device 1.

Figure 2:
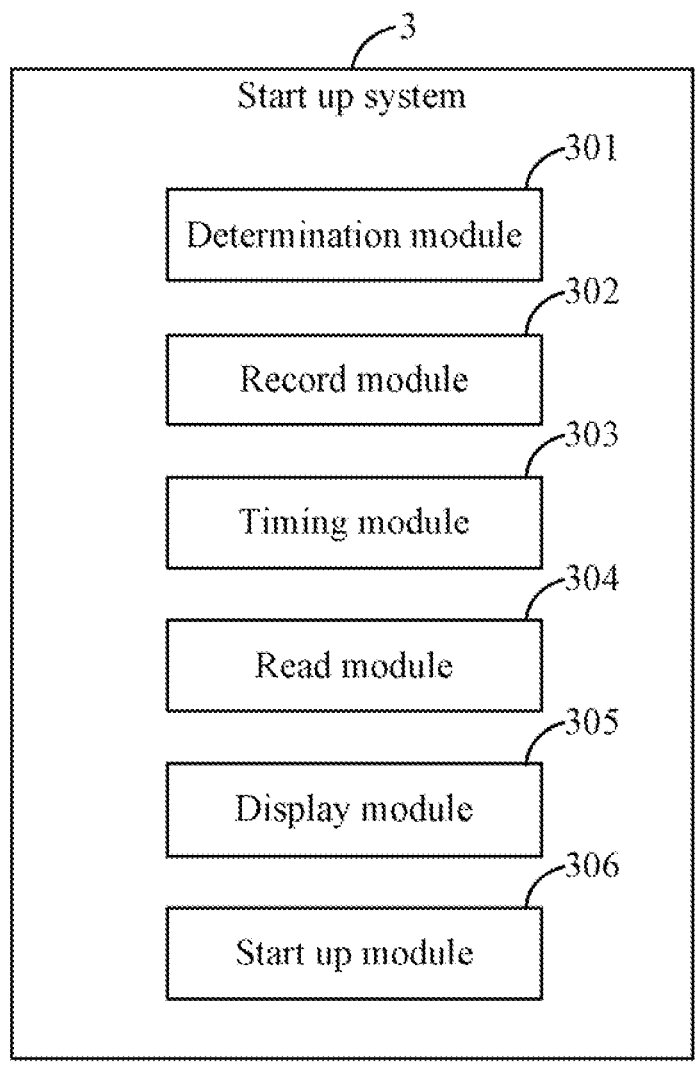
FIG. 2 is a block diagram of one embodiment of functional modules of a start up system included in the electronic device of FIG. 1.

FIG. 2 is a block diagram of one embodiment of functional modules of a start up system 3 included in the electronic device 1 of FIG. 1. In one embodiment, the start up system 3 may include a determination module 301, a record module 302, a timing module 303, a read module 304, a display module 305, and a start up module 306. The modules 301-306 may comprise a plurality of functional modules each comprising one or more programs or computerized codes that can be accessed and executed by the at least one processor 5. In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

The determination module 301 determines whether a usage history of an application that outputs audio is recorded in a log file of the storage system 2 when the application is started up. In the embodiment, the application may be, such as a media application, a game application, or a video application that outputs audios through an audio channel of the electronic device 1. The usage history may include information of the application, such as a name and an icon of the application.

The record module 302 records the usage history of the application into the log file if there is no prior usage history of the application in the log file. In one example, if the application is firstly used, there is no prior usage history of the application recorded in the log file.

The timing module 303 records a previously activated time that the application is started up in the log file for the application.

The determination module 301 determines whether an application previously activated is using the audio channel when a headphone is inserted to the headphone socket 10. If the application previously activated is using the audio channel, the headphone outputs audio.

The read module 304 reads usage histories of several applications that have used the audio channel from the log file of the storage system 2 when no application previously activated is using the audio channel. A user can predefine the number of the several applications via a keyboard or a touch screen of the electronic device 1. The read module 304 can read the usage histories of several applications according to the previously activated time of each of the several applications. The timing module 303 records the previously activated time of each of the several applications in the log file. For example, the number of the several applications is predefined as two, each usage history of three applications is respectively recorded in the log file of the storage system 2, and the three applications are audio player, video player and racing game. The previously activated time of each of the audio player, video player and racing game is t1, t2 and t3. The t1 is earlier than the t2, and the t2 is earlier than the t3. Therefore, the read module 304 may read the usage histories of the audio player and video player application from the log file of the storage system 2.

Figure 3:
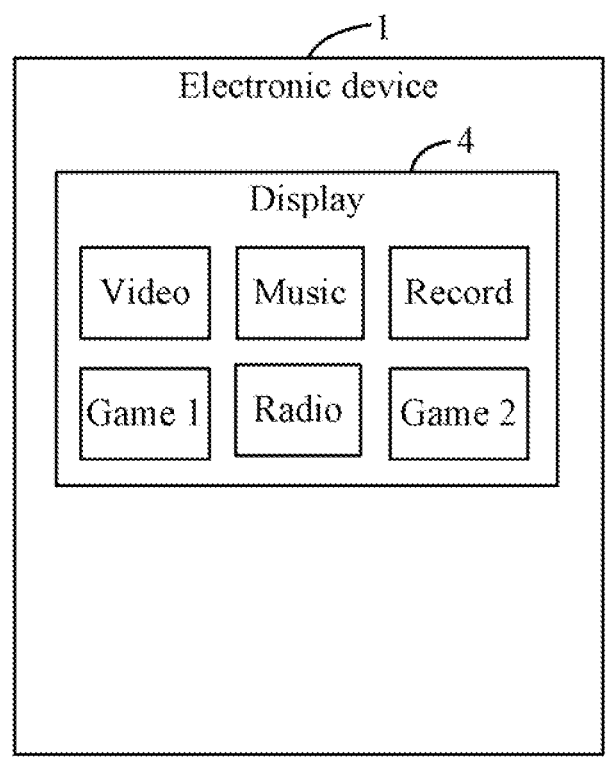
FIG. 3 is one example of a menu list displayed in the electronic device of FIG. 1.

The display module 305 displays a menu list of icons of the several applications on the display 4 for selection by the user. FIG. 3 shows the display 4 displaying six icons of "Video", "Music", "Record", "Game 1", "Radio", and "Game 2".

The start up module 306 starts up an application that is selected from the menu list displayed on the display 4 by the user via the keyboard or the touch screen of the electronic device 1. The application outputs audio via the headphone. If the user does not select an application, the display module 305 closes the menu list.

Figure 4:
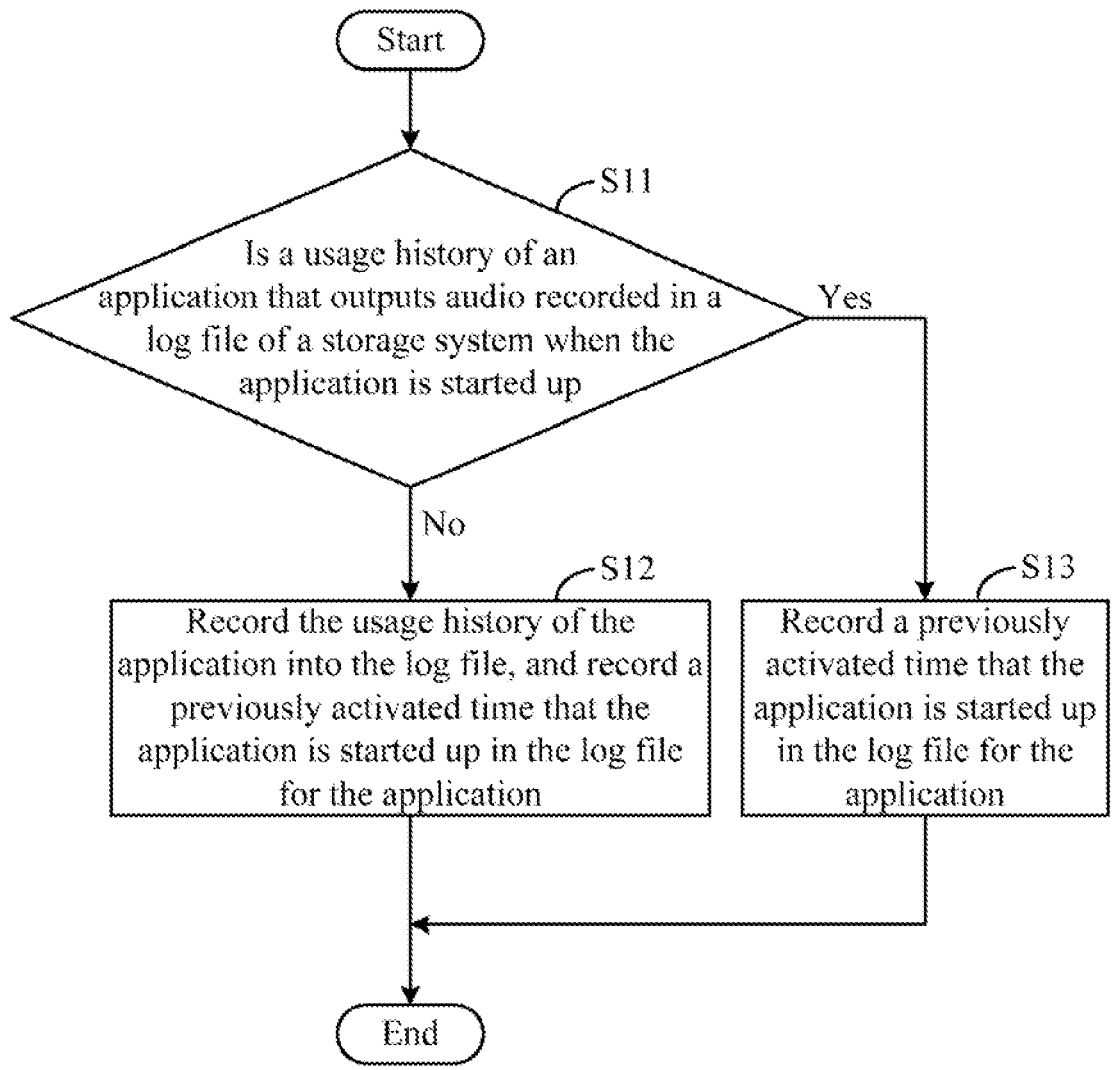
FIG. 4 is a flowchart of one embodiment of a method for recording a usage history of an application, which has used an audio channel of the electronic device of FIG. 1.

FIG. 4 is a flowchart of one embodiment of a method for recording a usage history of an application, which has used an audio channel of the electronic device 1 of FIG. 1.

In block S11, the determination module 301 determines whether a usage history of an application that outputs audio is recorded in the log file of the storage system 2 when the application is started up. If there is no prior usage history of the application in the log file, block S12 is implemented. If the usage history of the application is recorded in the log file, block S13 is implemented.

In block S12, the record module 302 records the usage history of the application into the log file of the storage system 2, and the timing module 303 records a previously activated time that the application is started up in the log file for the application.

In block S13, the timing module 303 records a previously activated time that the application is started up in the log file for the application.

Figure 5:
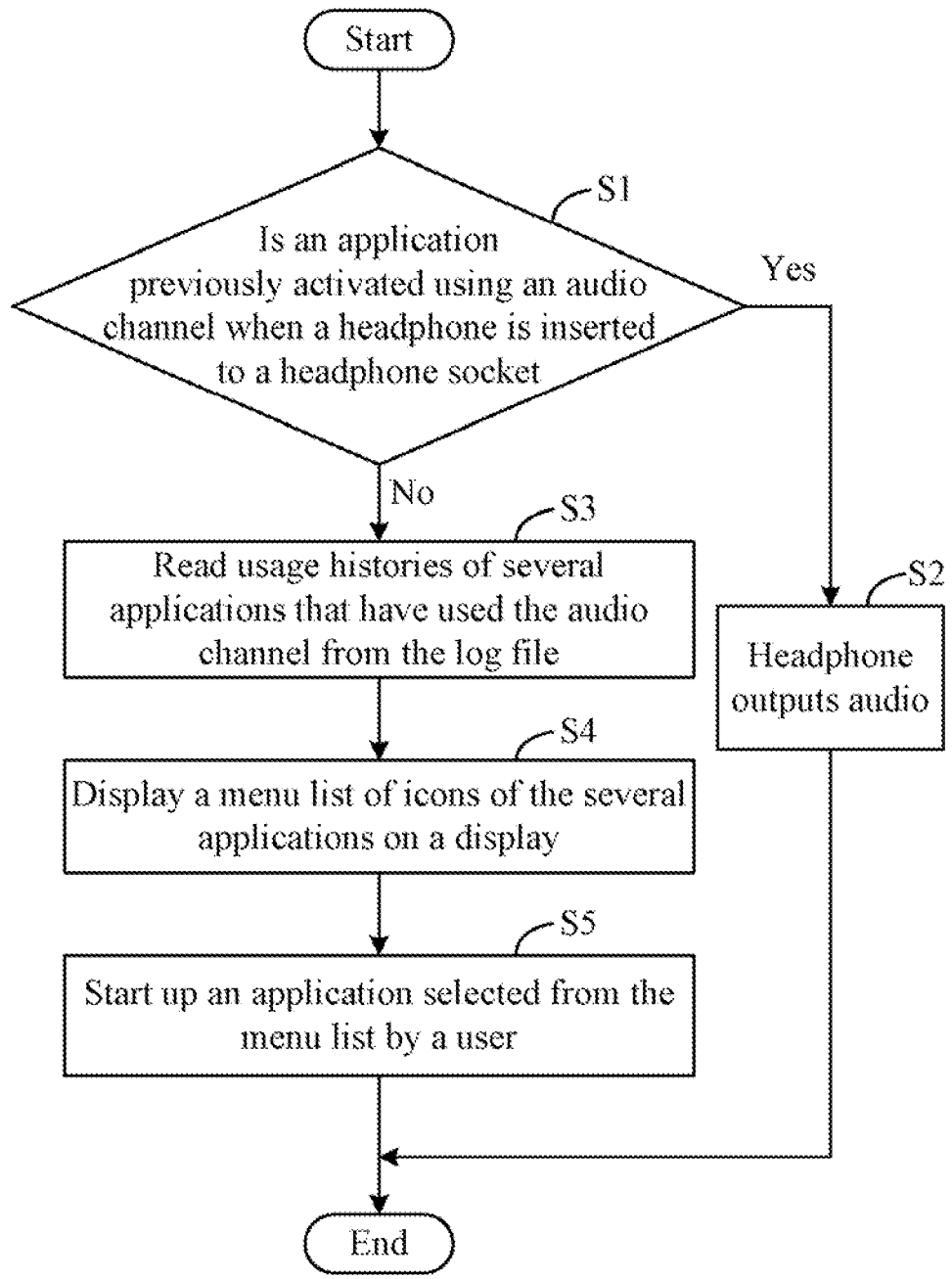
FIG. 5 is a flowchart of one embodiment of a method for starting up an application of the electronic device of FIG. 1.

FIG. 5 is a flowchart of one embodiment of a method for starting up an application of the electronic device 1 of FIG. 1.

In block S1, the determination module 301 determines whether an application previously activated is using the audio channel when a headphone is inserted to the headphone socket 10. If the application previously activated is using the audio channel, block S2 is implemented. If no application previously activated is using the audio channel, block S3 is implemented.

In block S2, the application previously activated outputs audio via the headphone.

In block S3, the read module 304 reads usage histories of several applications that have used the audio channel from the log file of the storage system 2. A user can predefine the number of the several applications via the keyboard or the touch screen of the electronic device 1. The read module 304 can read the usage histories of several applications according to the previously activated time of each of the several applications in the log file.

In block S4, the display module 305 displays a menu list of icons of the several applications on the display 4 for selection by the user.

In block S5, the start up module 306 starts up an application that is selected from the menu list displayed on the display 4 by the user via the keyboard or the touch screen of the electronic device 1. The application outputs audio via the headphone. If the user does not select an application, the display module 305 closes the menu list.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. An electronic device, comprising:
   a storage system;
   at least one processor;
   a headphone socket; and
   one or more programs stored in the storage system and executable by the at least one processor, the one or more programs comprising:
   a read module that reads, in the storage system, usage histories of only applications that have used an audio channel of the electronic device when a headphone jack is inserted to the headphone socket and no application is using the audio channel;
   a display module that displays a menu list comprising icons of only the applications that have used the audio channel on a display of the electronic device according to the usage histories read by the read module; and
   a start up module that starts up an application selected from the menu list by a user.

2. The electronic device of claim 1, wherein each of the usage histories comprises a name and an icon of a corresponding application.

3. The electronic device of claim 1, wherein the one or more programs further comprise:
   a determination module that determines whether the usage history of an application that outputs audio is recorded in a log file of the storage system when the application is started up;
   a record module that records the usage history of the application into the log file when the usage history of the application is not recorded in the log file;
   a timing module that records a previously activated time when the application is started up in the log file for the application.

4. The electronic device of claim 3, wherein the read module reads the usage histories of only the applications that have used the audio channel according to the previously activated time of each of only the applications that have used the audio channel in the log file.

5. A method for starting up an application executed by a processor of an electronic device, the method comprising:
   (a) reading usage histories of only applications that have used an audio channel of the electronic device when a headphone jack is inserted to a headphone socket of the electronic device and no application is using the audio channel;
   (b) displaying a menu list comprising icons of only the applications that have used the audio channel on a display of the electronic device, according to the read usage histories; and
   (c) starting up an application selected from the menu list by a user.

6. The method of claim 5, wherein each of the usage histories comprises a name and an icon of a corresponding application.

7. The method of claim 5, further comprising:
   determining whether the usage history of an application that outputs audio is recorded in a log file of the storage system when the application is started up;
   recording the usage history of the application into the log file of the storage system when the usage history of the application is not recorded in the log file;
   recording a previously activated time when the application is started up into the log file for the application.

8. The method of claim 7, wherein the usage histories of only the applications that have used the audio channel are read according to the previously activated time of each of only the applications that have used the audio channel in the log file.

9. A non-transitory storage medium storing a set of instructions, the set of instructions capable of being executed by a processor of an electronic device, causes the electronic device to execute a method for starting up an application of the electronic device, the method comprising:

(a) reading usage histories of only applications that have used an audio channel of the electronic device when a headphone jack is inserted to a headphone socket of the electronic device and no application is using the audio channel;

(b) displaying a menu list comprising icons of only the applications that have used the audio channel on a display of the electronic device according to the read usage histories; and (c) starting up an application selected from the menu list by a user.

10. The storage medium of claim 9, wherein each of the usage histories comprises a name and an icon of a corresponding application.

11. The storage medium of claim 9, wherein the method further comprises:

determining whether the usage history of an application that outputs audio is recorded in a log file of the storage system when the application is started up;

recording the usage history of the application into the log file of the storage system when the usage history of the application is not recorded in the log file;

recording a previously activated time when the application is started up into the log file for the application.

12. The storage medium of claim 11, wherein the usage histories of only the applications that have used the audio channel are read according to the previously activated time of each of only the applications that have used the audio channel in the log file.

13. The electronic device of claim 1, wherein the display module further closes the menu list when no application is selected from the menu list within a predetermined time period.

14. The method of claim 5, further comprises: closing the menu list when no application is selected from the menu list within a predetermined time period.

15. The storage medium of claim 9, wherein the method further comprises closing the menu list when no application is selected from the menu list within a predetermined time period.

* * * * *